United States Patent
Iwaki et al.

(10) Patent No.: US 6,219,191 B1
(45) Date of Patent: Apr. 17, 2001

(54) PLASTIC LENS

(75) Inventors: Makoto Iwaki; Haruyuki Ohashi, both of Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/604,927

(22) Filed: Jun. 28, 2000

Related U.S. Application Data (62) Division of application No. 09/034,605, filed on Mar. 3, 1998, now Pat. No. 6,144,500.

(30) Foreign Application Priority Data

Mar. 5, 1997 (JP) .................................................... 9-067460
Jan. 14, 1998 (JP) .................................................. 10-018000

(51) Int. Cl.[7] .................................................. G02B 7/02
(52) U.S. Cl. .................... 359/811; 359/719; 359/718; 264/1.1
(58) Field of Search ........................... 264/1.1; 359/719, 359/718, 811

(56) References Cited

U.S. PATENT DOCUMENTS

| | | | |
|---|---|---|---|
| 5,257,145 | 10/1993 | Kanazawa et al. | 359/819 |
| 5,555,480 | 9/1996 | Tanaka et al. | 359/822 |
| 5,642,235 | 6/1997 | Ichikawa | 359/811 |
| 5,975,882 | 11/1999 | Nomura et al. | 425/808 |
| 6,055,111 * | 4/2000 | Nomura et al. | 359/642 |

FOREIGN PATENT DOCUMENTS

| | | |
|---|---|---|
| 58-69811 | 5/1983 | (JP) . |
| 59-188601 | 10/1984 | (JP) . |

* cited by examiner

*Primary Examiner*—Georgia Epps
*Assistant Examiner*—Tim Thompson
(74) *Attorney, Agent, or Firm*—Greenblum & Bernstein, P.L.C.

(57) ABSTRACT

A plastic lens which can be positioned correctly during lens mounting. The plastic lens is used as a pickup lens on an optical head for an optical disk and it has a lens portion in the center with an annular rim formed on the periphery. The rim has two opposed surfaces, one of which provides a reference plane to effect positioning for fixing the plastic lens in a lens holder. The rim has a gate portion which remains to project from the periphery after a molten plastic material was injected through the corresponding channel during molding. The gate portion is cut off by a pair of cutting blades which are moved to come closer to each other in a direction substantially parallel to the optical axis of the lens portion. As the result of the cutting operation, a bur occurs at a distal end of the gate portion and it projects in a direction parallel to a plane orthogonal to the optical axis.

10 Claims, 6 Drawing Sheets

PLASTIC LENS

This is a division of U.S. patent application Ser. No. 09/034,605, filed Mar. 3, 1998, Now U.S. Pat. No. 6,144,500, the contents of which are expressly incorporated by reference herein in its entirety.

BACKGROUND OF THE INVENTION

The present invention relates to a plastic lens, in particular a pickup lens which is a component of an optical head for optical disks, magnetooptical disks and the like.

The drive unit of optical disks, magnetooptical disks and the like (which are hereunder collectively referred to as "optical disks") is equipped with an optical head for reading out the information recorded on the optical disks.

The optical head has a pickup lens (objective lens) fixed on a lens holder in the moving part of an actuator and when an electric current is applied to the coil of the actuator, the moving part is driven in two independent directions, one being parallel to the optical axis of the pickup lens and the other being along the radius of the optical disk, so as to perform focusing and tracking control.

The pickup lens is typically manufactured by injection molding of plastic materials. The gate or channel through which a molten plastic material is injected into a mold is located on a lateral side of a cavity (molding space) which conforms to the shape of the pickup lens to be molded and, hence, the produced pickup lens has a corresponding projection (gate portion) formed as an integral part of the periphery.

SUMMARY OF THE INVENTION

An object of the present invention is to provide a plastic lens from which unnecessary gate portion is at least partially removed, to thereby facilitate mounting of the plastic lens to a lens holder with accuracy and ease.

Another object of the present invention is to provide a plastic lens from which unnecessary gate portion is at least partially removed without any adverse effect on the optical characteristic of the lens.

To achieve the above-noted and other objects, the present invention provides the followings:

(1) A plastic lens injection-molded with a plastic material, the plastic lens comprising:
   a lens portion which functions effectively as a lens; and
   an ineffective area which does not function as a lens, the ineffective area being located radially outward of the lens portion and continuous with the lens portion, the ineffective area having a generally flat area substantially oriented radially outward of the lens portion and being formed as a consequence of removing a portion of the ineffective area.

(2) A plastic lens according to (1), wherein the ineffective area includes a gate portion corresponding to a channel through which a molten plastic material was injected during molding, and the generally flat area is formed as a consequence of cutting off a portion of the gate portion.

(3) A plastic lens according to (2), wherein the portion of the gate portion is cut off by relatively moving a pair of cutting blades toward each other in a direction substantially parallel to an optical axis of the lens portion.

(4) A plastic lens according to (3), wherein the ineffective area further includes an annular rim circumscribing the lens portion entirely, the gate portion projecting from the annular rim radially outward and continuous with the lens portion through the annular rim.

(5) A plastic lens according to (4), wherein the annular rim defines a reference plane orthogonal to the optical axis of the lens portion, and the generally flat area is located entirely on one side in a direction parallel to the optical axis with respect to the reference plane.

(6) A plastic lens according to (1), wherein the ineffective area includes an annular rim circumscribing the lens portion entirely, and the generally flat area is formed as a consequence of cutting off a portion of the annular rim together with a gate portion corresponding to a channel through which a molten plastic material was injected during molding.

(7) A plastic lens according to (6), wherein the annular rim can be distinguished from the lens portion visually or tangibly.

(8) A plastic lens according to (6), wherein the ineffective area has a maximum thickness smaller than a minimal thickness of the lens portion.

(9) A plastic lens according to (6), wherein the generally flat area is located radially inward relative to an outermost circumference of the plastic lens.

(10) A plastic lens according to (6), wherein the generally flat area does not traverse the lens portion.

The present disclosure relates to the subject matter contained in Japanese patent application Nos. 9-67460 (filed on Mar. 5, 1997) and 10-18000 (filed on Jan. 14, 1998) which are expressly incorporated herein by reference in their entireties.

DETAILED DESCRIPTION OF THE PREFERRED EMBODIMENTS

The plastic lens of the invention will now be described in detail with reference to preferred embodiments shown in the accompanying drawings.

Figure 1:
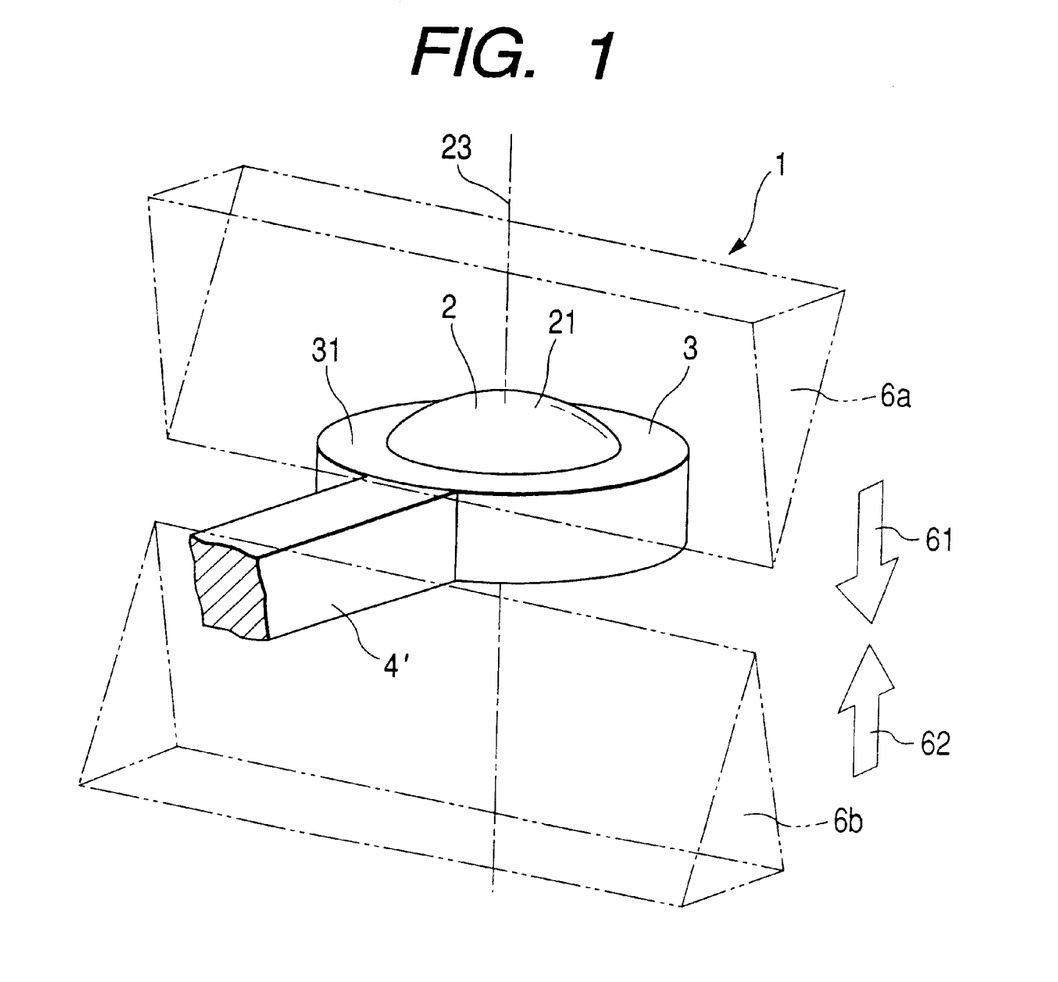
FIG. 1 is a perspective view showing a plastic lens according to a first embodiment of the invention before a gate portion is cut off.
Figure 2:
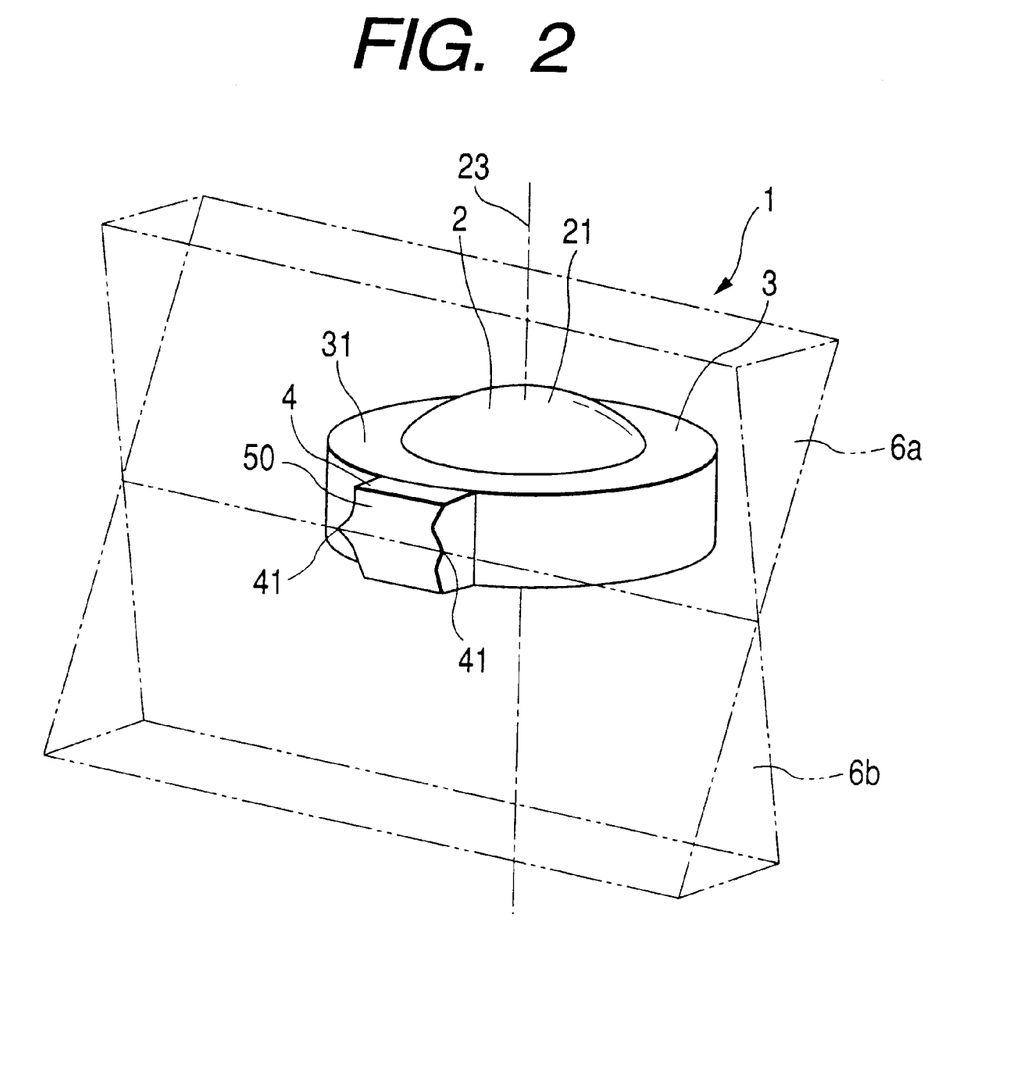
FIG. 2 is a perspective view showing the plastic lens after the gate portion is cut off.
Figure 3:
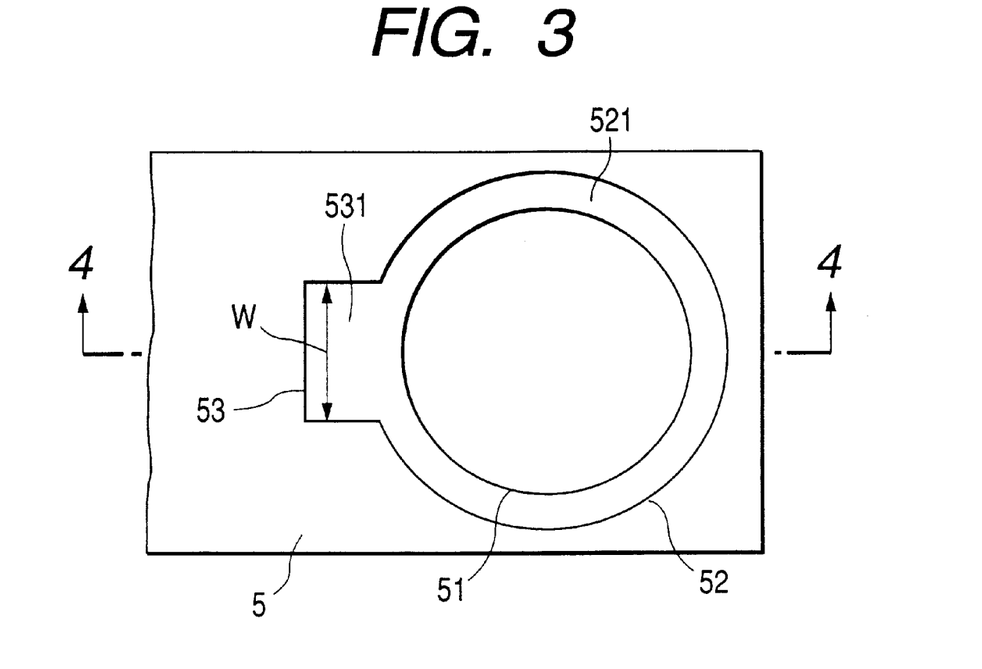
FIG. 3 is a plan view showing an exemplary construction of a lens holder.
Figure 4:
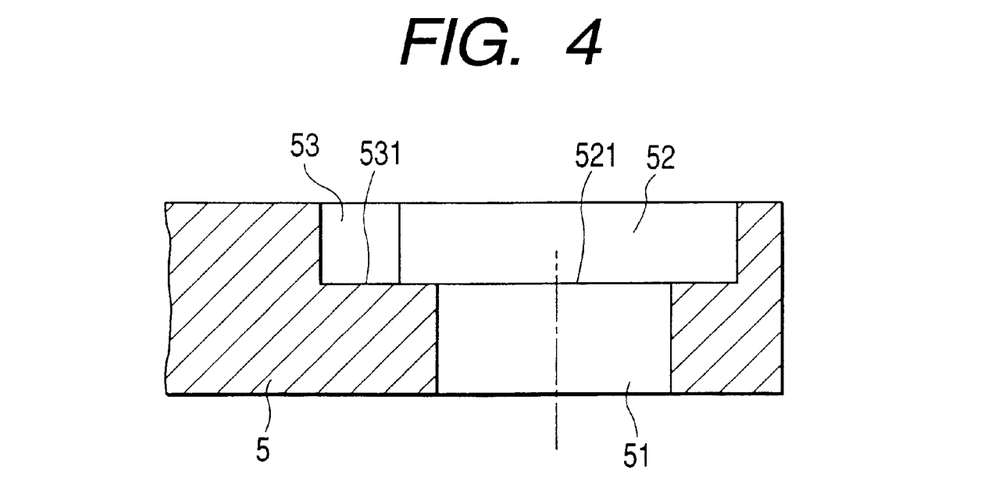
FIG. 4 is a sectional view taken along line 4—4 of FIG. 3.
Figure 5:
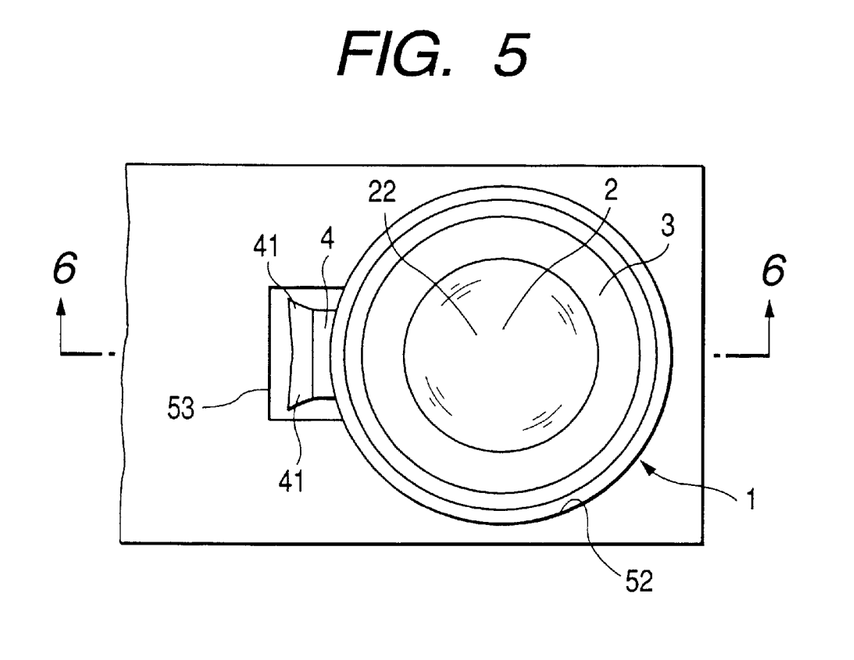
FIG. 5 is a plan view showing the plastic lens of the invention as it is fixed in the lens holder.
Figure 6:
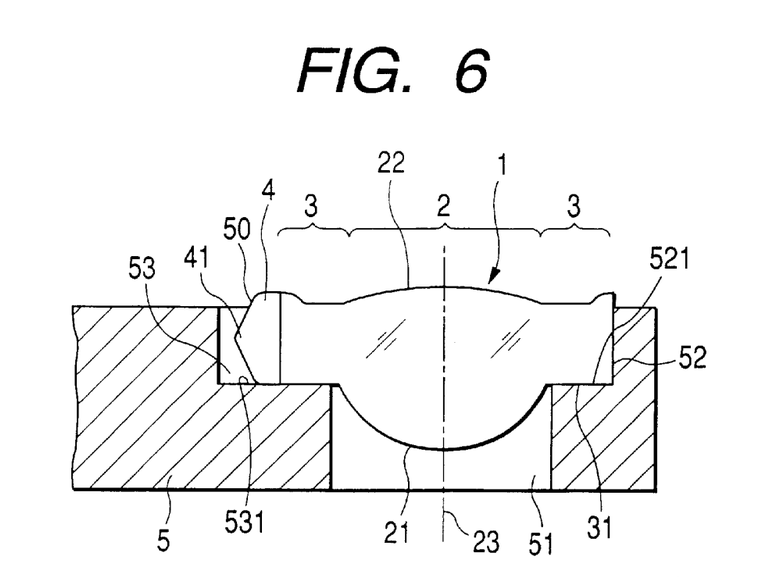
FIG. 6 is a sectional view taken along line 6—6 of FIG. 5.

FIGS. 1 and 2 are perspective views showing a plastic lens according to a first embodiment of the invention; FIG. 3 is a plan view showing an exemplary construction of a lens holder; FIG. 4 is a sectional view taken along line 4—4 of FIG. 3; FIG. 5 is a plan view showing the plastic lens of the invention as it is fixed in the lens holder; and FIG. 6 is a sectional view taken along line 6—6 of FIG. 5.

It should be noted that FIG. 1 shows an appearance of the plastic lens before a (projecting) gate portion is cut off whereas FIG. 2 shows an appearance of the plastic lens after the gate portion is cut off.

The plastic lens according to the embodiment under consideration which is generally indicated by 1 is used as a pickup lens on an optical head for an optical disk and, as shown in FIGS. 1 and 2, it has a lens portion 2 in the center which functions effectively as a lens.

The lens portion 2 has a first curved surface 21 on one side which is spherical in shape and it has a second curved surface 22 (see FIG. 6) on the other side which is also spherical in shape. The curvature of the first curved surface 21 is set to be greater than that of the second curved surface 22. One of the first and second curved surfaces 21 and 22 may be dispensed with.

The plastic lens 1 has an annular rim or flange 3 formed on the periphery of the lens portion 2. The rim 3 has two opposed surfaces, one being on the top and the other on the bottom as seen in FIG. 2. One of the opposed surfaces of the rim 3 which is on the side where the first curved surface 21 is formed provides a reference plane 31 to effect positioning for fixing the plastic lens 1 in a lens holder (lens support member) 5. The rim 3 is formed as an ineffective area which does not function as a lens. The rim 3 is formed concentric with the lens portion 2, with the center being the optical axis of the lens portion 2.

The rim 3 also has a gate portion 4 which remains to project outward of the periphery after a molten plastic material was injected through the corresponding channel during molding. The gate portion 4 is included in the ineffective area which does not function as a lens in the context of the present invention.

The lens portion 2, rim 3 and gate portion 4 are formed integrally of the same plastic material. Examples of the plastic material include polymethyl methacrylate, polycarbonates, polystyrenes, acrylonitrile-styrene copolymer, poly(-4-methylpentene-1) and cyclic olefin copolymers.

As shown in FIG. 1, the remaining gate portion 4' is substantially cut off by means of a pair of cutting blades 6a and 6b to give a shape as indicated by 4 in FIG. 2. The cutting direction, namely, the direction in which the cutting blades 6a and 6b are moved, is substantially parallel to the optical axis 23 of the lens 2 as indicated by arrows 61 and 62 in FIG. 1.

As a consequence of the cutting operation, the distal end of the gate portion is formed as a generally flat area 50 substantially oriented radially outward, and a bur 41 occurs at that distal end of the gate portion 4 so that it projects in a direction parallel to a plane orthogonal to the optical axis 23 of the lens portion 2. Therefore, as discussed below, the bur 41 will cause no adverse effects during positioning for fixing the plastic lens 1 in the lens holder 5.

In the embodiment under consideration, the cutting blades 6a and 6b both move in such a direction that they come closer to each other. As a result, the bur 41 occurs at a site which is substantially the center of the thickness of the rim 3 (about one half its thickness).

However, this is not the sole case of the invention and one of the cutting blades 6a and 6b may be fixed while the other moves toward it. In this alternative case, the position of the bur 41 is not in the center of the thickness of the rim 3 but deviates toward either the first curved surface 21 or the second curved surface 22 of the lens portion 2. However, the bur 41 causes no adverse effects during positioning for fixing the plastic lens 1 in the lens holder 5 because the bur 41 projects in a direction parallel to a plane orthogonal to the optical axis 23 of the lens portion 2 as in the embodiment under consideration.

As shown in FIGS. 3 and 4, the lens holder 5 has a first circular opening 51 on one side, a second circular opening 52 on the other side which communicates with the first circular opening 51, and a generally rectangular recess 53 which is formed adjacent the periphery of the second circular opening 52 to communicate with it.

The first circular opening 51 has an inside diameter equal to or slightly greater than the diameter of the lens portion 2 (the first curved surface 21) whereas the second circular opening 52 has an inside diameter substantially equal to the diameter of the rim 3.

The underside 521 of the second circular opening 52 and that of the recess 53 form a coextensive plane, which is contacted by the reference plane 31 of the plastic lens 1 so that the plastic lens 1 is correctly positioned with respect to the lens holder 5 in a direction parallel to the optical axis of the lens portion 2.

As shown specifically in FIGS. 5 and 6, when the plastic lens 1 is inserted into the lens holder 5 such that the gate portion 4 fits in the recess 53, the rim 3 fits in the second circular opening 52 so that the plastic lens 1 is properly positioned in a lateral direction (perpendicular to the optical axis 23) and, concurrently, the reference plane 31 of the rim 3 contacts the underside 521 of the second circular opening 52 so that the plastic lens 1 is properly positioned with respect to the lens holder 5 in a direction parallel to the optical axis 23.

The first curved surface 21 of the lens portion 2 is located within the first circular opening 51. The gate portion 4 is received in the recess 53 to make contact with its underside 531.

The bur 41 at the distal end of the gate portion 4 projects not parallel to the optical axis 23 but parallel to a plane orthogonal to the optical axis 23. That is, the distal end of the gate portion 4 deformed through the cut-off operation does not go beyond the reference plane 31 downward as seen in FIG. 6.

In other words, there will be no inconvenience such as where the bur 41 contacts with the underside 531 of the recess 5 to raise the plastic lens 1 and, hence, the bur 41 will cause no adverse effects on the positioning of the plastic lens 1 with respect to the lens holder 5 in a direction parallel to the optical axis 23.

In addition, the width W of the recess 53 is of such a dimension that an adequate allowance for receiving the gate portion 4 is provided in consideration of the projection of the bur 41. Hence, the bur 41 will not contact a lateral side of the recess 53 to interfere with the accommodation of the gate portion 4 and the positioning of the plastic lens 1 in a lateral direction.

It should be noted that the gate portion is not the only part that is cut off in the invention and any other projecting part of the lens portion may be cut off in the manner described above.

As described on the foregoing pages, the plastic lens of the first embodiment of the invention offers the advantage of eliminating the adverse effects of burs which would otherwise occur upon cutting off of the gate portion, thereby achieving correct positioning of the lens to provide the desired registry during mounting operations.

Further, although the cut-off operation may cause a stress concentration in the vicinity of the cutting plane, which adversely affects the optical characteristic of the plastic lens, the plastic lens 1 of the first embodiment offers an advantage in that the cutting plane exists on the gate portion 4, i.e. the ineffective area which does not function as a lens, and therefore the optical characteristics of the plastic lens 1 will in no way be affected adversely even if such stress concentration occurs.

Next, a plastic lens according to a second embodiment will be described with reference to FIGS. 7 to 10.

Figure 7:
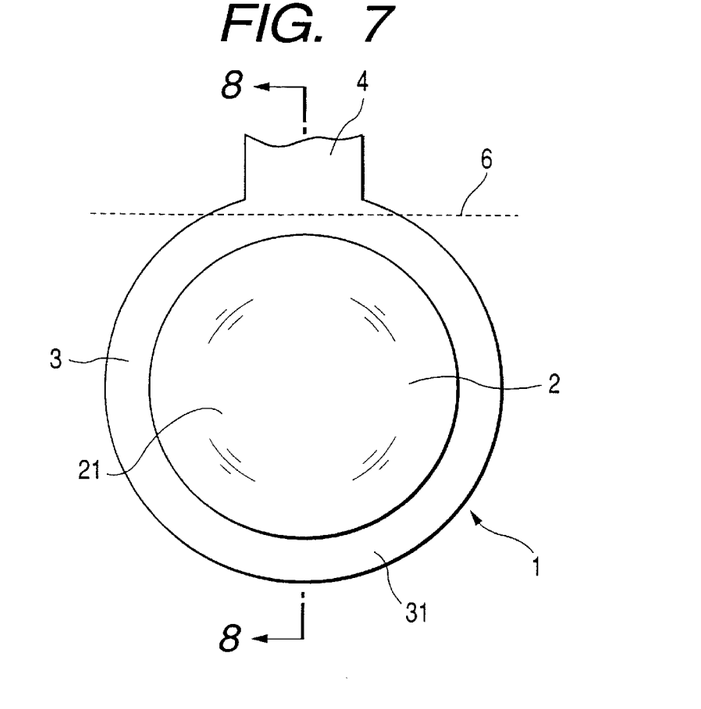
FIG. 7 is a plane view showing a plastic lens according to a second embodiment of the invention before a gate portion is cut off.
Figure 8:
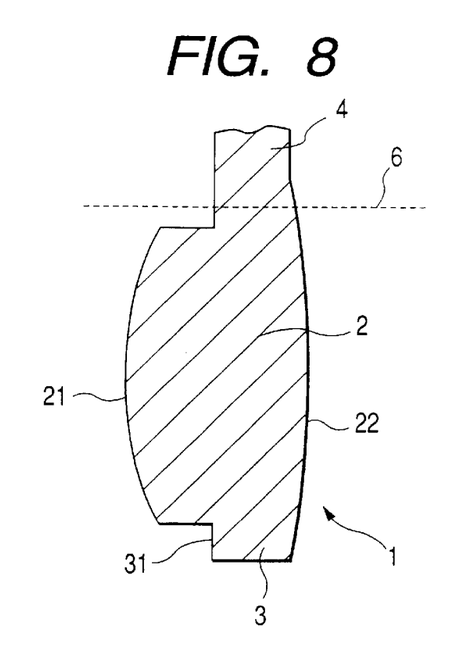
FIG. 8 is a sectional view taken along line 8—8 of FIG. 7.

In the second embodiment, the lens portion 2 can be distinguished from the rim 3 either visually or tangibly. Briefly, the rim 3 has a thickness $T_2$ which is smaller than the thickness of the lens portion 2 (more accurately, its minimum thickness $T_1$) so as to form a step at the boundary between the two portions. The contour of the step provides ease in distinguishing between the lens portion 2 and the rim 3 either visually or tangibly.

The thickness $T_2$ of the rim 3 is not limited to any particular value but it is typically in a range of from about 0.8 mm to about 2 mm, preferably from about 1.0 mm to 1.8 mm. For practical purposes, the difference between $T_1$ and $T_2$ is desirably at least about 1 mm but smaller values may be adopted. It is also within the scope of the invention that $T_1$ is equal to or smaller than $T_2$.

Other methods that enable the lens portion 2 to be distinguished from the rim 3 include pigmenting the surfaces of the rim 3 while maintaining the lens portion 2 transparent, roughening the surfaces of the rim 3, and forming a border line between the lens portion 2 and the rim 3.

Figure 9:
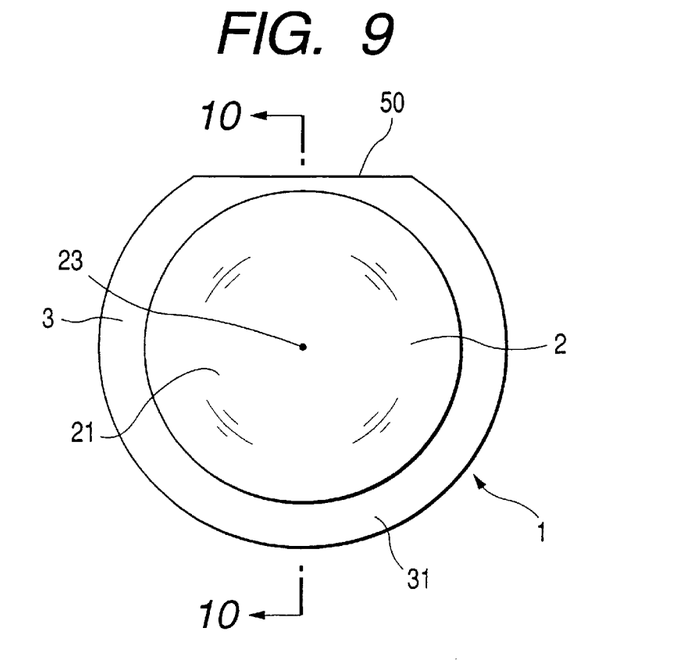
FIG. 9 is a plane view showing the plastic lens according to the second embodiment after the gate portion is cut off.
Figure 10:
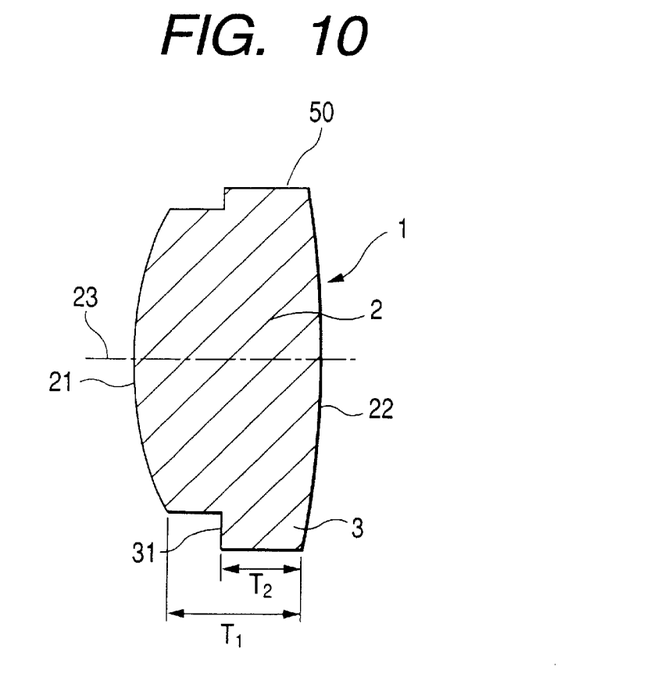
FIG. 10 is a sectional view taken along line 10—10 of FIG. 9.

As shown in FIGS. 9 and 10, the gate portion 4 is cut off together with part of the rim 3 to produce a complete form of the plastic lens 1. As indicated by a dashed line 6 in FIGS. 7 and 8, the cutting plane traverses the rim 3 without crossing the lens portion 2. In this way, the entire part of the gate portion 4 is removed and yet the optical characteristics of the plastic lens 1 will in no way be affected adversely. In general, the cut-off operation may cause a stress concentration in the vicinity of the cutting plane, which adversely affects the optical characteristic of the plastic lens, but in the second embodiment the cutting plane exists on the rim 3, i.e. the ineffective area which does not function as a lens, and therefore the optical characteristics of the plastic lens 1 will in no way be affected adversely even if such stress concentration occurs.

Further, as similarly to the first embodiment, the cutting direction, namely, the direction in which the cutting blades are moved, is substantially parallel to the optical axis of the lens portion 2.

By cutting off the gate portion 4, an arched part of the rim 3 is also removed to leave a generally flat area 50 that is substantially oriented radially outward, and that corresponds to the chord of the arc. The generally flat area 50 is located inward of the circumference of the remaining rim 3 (or the outermost circumference of the plastic lens 1). In other wards, no part is left that projects outward of the circumference of the rim 3.

This provides ease in assembling the plastic lens 1 and, in particular, there is no need to form a relief (i.e. the recess 53 in FIG. 3) in the lens holder as an area for getting around the remainder of the gate portion; instead, the recess in the lens holder into which the lens is to be inserted may have a circular shape and this simplifies the geometry of the lens holder. Further, to mount the plastic lens on the lens holder, the positioning in the direction of the optical axis is only required, and there is no need to perform the positioning in the circumferential direction of the plastic lens 1. Hence, the present invention offers the advantage of simplifying the procedure of the positioning between the plastic lens and the lens holder.

As already mentioned, the plastic lens 1 of the invention has the lens portion 2 that is clearly distinguishable from the rim 3 (i.e., the boundary of the two portions is discernable), so the plane 6 through which the gate portion 4 is to be cut off can be set easily and positively enough to provide ease in the cutting operation while preventing cutting in an unwanted position. Should cutting be done in an inappropriate position, the operator can easily recognize the fact.

As also mentioned above, the rim 3 has its thickness $T_2$ made smaller than the lens portion 2 and this provides ease in cutting the gate portion 4 across the rim 3.

The method of cutting the gate portion 4 through the plane 6 is not limited to any particular way and various known techniques may be employed such as cutting with a reciprocating or rotating blade or cutting by thermal fusion. Further, the direction in which the gate portion 4 is cut off or the cutting blade(s) is moved is not limited to any particular direction. If required, the cut surface may be repaired by corrective operations such as deburring, grinding and polishing.

As described on the foregoing pages, the plastic lens of the second embodiment of the invention has a simple structure to permit the gate portion to be cut off without adversely affecting the optical characteristics of the lens. The simple structure of the plastic lens offers another advantage in that the shape and structure of the cavity in the lens forming mold need not be rendered complex and this allows the mold to be manufactured easily and at low cast.

Since no adverse effects are caused to the optical characteristics of the plastic lens by cutting off the gate portion at the rim, the quality and performance of the lens can be maintained at high level.

What is more, the operation of cutting off the gate portion can be accomplished in any easy and appropriate manner.

If the site at which the gate portion has been cut off is located inward of the outermost circumference of the plastic lens, the latter can be easily received and fixed in a lens holder without rendering its shape any complex at all.

While the plastic lens of the invention has been described above on the basis of the illustrated embodiments, the invention is by no means limited thereto and the respective parts of the invention may be replaced by any equivalents that are capable of performing identical functions.

Needless to say, the use of the plastic lens of the invention is by no means limited to the pickup lens of the described type which is used as part of an optical head.

What is claimed is:

1. A plastic lens made by:
    forming an injection-molded member having a lens portion which functions effectively as a lens, and an ineffective area which does not function as a lens, wherein said ineffective area is located radially outwardly of said lens portion and is continuous with said lens portion; and
    cutting off a portion of said ineffective area from said injection-molded member by moving at least one of a pair of cutting blades toward another of said pair of cutting blades in a direction substantially parallel to an optical axis of said lens portion.

2. The plastic lens made according to claim 1, wherein said ineffective area includes a gate portion corresponding to a channel through which a molten plastic material was injected during molding of the member, and wherein the cutting off includes cutting off a portion of said gate portion by relatively moving said at least one of said pair of cutting blades toward said another pair of cutting blades in the direction substantially parallel to said optical axis of said lens portion.

3. The plastic lens made according to claim 1, wherein said ineffective area includes an annular rim entirely circumscribing said lens portion, and wherein the cutting off includes cutting off a portion of said annular rim together with a gate portion corresponding to a channel through which a molten plastic material was injected during molding of the member by relatively moving said at least one of said pair of cutting blades toward said other of said pair of cutting blades in the direction substantially parallel to said optical axis of said lens portion.

4. The plastic lens made according to claim 3, further including defining, by the annular rim, a reference plane orthogonal to the optical axis of the lens portion, and locating a generally flat portion of said ineffective area entirely on one side, in a direction parallel to the optical axis, with respect to the reference plane.

5. The plastic lens made according to claim 2, further comprising forming the ineffective area to include an annular rim entirely circumscribing the lens portion, the annular rim including a generally flat area, and forming the generally flat area as a consequence of cutting off a portion of the annular rim together with a gate portion corresponding to a channel through which molten plastic material was injected during molding of the member.

6. The plastic lens made according to claim 5, further comprising forming the annular rim so as to be visually distinguishable from the lens portion.

7. The plastic lens made according to claim 5, further comprising forming the annular rim so as to be tangibly distinguishable from the lens portion.

8. The plastic lens made according to claim 2, further comprising forming the ineffective area to have a maximum thickness smaller than a minimal thickness of the lens portion.

9. The plastic lens made according to claim 5, further comprising locating the generally flat area radially inward relative to an outermost circumference of the plastic lens.

10. The plastic lens made according to claim 5, further comprising forming the generally flat area so that it does not traverse the lens portion.

* * * * *